United States Patent [19]
Jacobson et al.

[11] Patent Number: 5,998,503
[45] Date of Patent: *Dec. 7, 1999

[54] POLYMER FLAME RETARDANT

[75] Inventors: Howard Wayne Jacobson, Wilmington, Del.; Robert Valentine Kasowski, West Chester, Pa.

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/036,477

[22] Filed: Mar. 6, 1998

Related U.S. Application Data

[62] Division of application No. 08/705,938, Aug. 29, 1996.

[51] Int. Cl.⁶ ..................................................... C08K 9/10
[52] U.S. Cl. ............................................ 523/210; 523/210
[58] Field of Search .................................... 523/210, 212; 524/121

[56] References Cited

U.S. PATENT DOCUMENTS

| | | | |
|---|---|---|---|
| 3,154,513 | 10/1964 | Illing et al. | 260/31.8 |
| 3,440,210 | 4/1969 | Blount et al. | 260/41 |
| 3,914,513 | 10/1975 | Brown et al. | 428/425 |
| 4,155,900 | 5/1979 | Walters | 260/45.8 |
| 4,257,931 | 3/1981 | Granzow | 260/45.8 NE |
| 4,278,591 | 7/1981 | Granzow | 260/45.75 D |
| 4,279,652 | 7/1981 | Ciaperoni et al. | 106/18.21 |
| 4,467,056 | 8/1984 | Staendeke et al. | 523/208 |
| 4,599,375 | 7/1986 | Berte' et al. | 524/100 |
| 4,786,673 | 11/1988 | Morival et al. | 524/101 |
| 4,871,795 | 10/1989 | Pawar | 524/267 |
| 4,987,172 | 1/1991 | Higashitsuji et al. | 524/416 |
| 4,994,549 | 2/1991 | Chiolle et al. | 528/272 |
| 5,021,484 | 6/1991 | Schreiber et al. | 524/100 |
| 5,089,559 | 2/1992 | Blount | 525/107 |

(List continued on next page.)

FOREIGN PATENT DOCUMENTS

| | | |
|---|---|---|
| 0 418 210 A1 | 3/1991 | European Pat. Off. . |
| 422 733 A1 | 4/1991 | European Pat. Off. ...... C08K 5/3492 |
| 540 861 B1 | 5/1992 | European Pat. Off. ......... A62D 1/00 |
| 614 936 A2 | 9/1994 | European Pat. Off. .......... C08K 9/04 |
| 0 627 460 | 12/1994 | European Pat. Off. . |
| 650 171 A2 | 4/1995 | European Pat. Off. .......... H01B 3/18 |
| 659 819 A1 | 6/1995 | European Pat. Off. .......... C08K 9/04 |
| 0 693 531 A2 | 1/1996 | European Pat. Off. . |
| 2856457A | 7/1980 | Germany . |
| 44 36 281 A1 | 4/1996 | Germany ......................... C08L 77/00 |
| 58-138746 | 8/1983 | Japan .............................. C08L 27/06 |
| 59-001718A | 1/1984 | Japan . |
| 08165425A | 6/1996 | Japan . |
| 1 373 908 | 11/1974 | United Kingdom ........... C08G 45/00 |
| 2152061A | 7/1985 | United Kingdom . |
| 2 277 092 | 10/1994 | United Kingdom ......... C08K 5/3492 |
| WO 92 07901 | 5/1992 | WIPO . |
| WO 92/20731 | 11/1992 | WIPO .............................. C08K 3/00 |
| WO 96/09344 | 3/1996 | WIPO ............................. C08K 13/04 |
| WO 97 23565 | 7/1997 | WIPO . |

OTHER PUBLICATIONS

Database WPI, Section Ch, Week 8339, Derwent Publications Ltd., London, GB; Class A41, AN83–773228 XP002047353 & JP 58 138 746 A (Plus Tech KK), 17; Aug. 1983–Abstract.

*Primary Examiner*—Edward J. Cain

[57] ABSTRACT

A flame retardant composition comprising coated particles, said particles having a core comprising melamine phosphate, melamine polyphosphate, melamine pyrophosphate, or mixtures thereof, said core having at least one coating comprising an organo silane, ester, polyol, dianhydride, dicarboxylic acid, melamine formaldehyde, or mixtures thereof; a polymer composition containing said flame retardant; a polymer composition containing a flame retardant comprising melamine phosphate, melamine polyphosphate, melamine pyrophosphate or mixtures thereof, and dicarboxylic acid, dianhydride, or mixtures thereof; and a process for preparation of said polymer compositions by increasing extruder throughput are disclosed.

13 Claims, 4 Drawing Sheets

U.S. PATENT DOCUMENTS

| | | | |
|---|---|---|---|
| 5,116,891 | 5/1992 | Eberspach et al. | 524/97 |
| 5,158,999 | 10/1992 | Swales et al. | 524/100 |
| 5,236,988 | 8/1993 | Doyama et al. | 524/404 |
| 5,409,976 | 4/1995 | Lindsay | 524/100 |
| 5,430,080 | 7/1995 | Iwata et al. | 524/100 |
| 5,618,865 | 4/1997 | Martens et al. | 524/100 |
| 5,708,065 | 1/1998 | Martens et al. | 524/100 |

POLYMER FLAME RETARDANT

This is is a division of Application Ser. No. 08/705,938 filed Aug. 29, 1996, now pending.

FIELD OF THE INVENTION

This invention relates to flame retardant compositions for polymers comprising particulate flame retardants with a coating, particulate flame retardants with an additive, polymers containing such flame retardants as a disperse phase, and a process for their preparation.

BACKGROUND OF THE INVENTION

Halogenated compounds are added to polymeric materials to improve flame retardant properties. Such halogenated additives, for example brominated polystyrene, can be effective flame retardants, passing V-O flammability rating in the Underwriters Laboratory UL-94 test for molded bars, and do not seriously impact the mechanical, thermal, ultraviolet photostability, or electrical properties of the flame retarded polymer. However, there are increasing concerns over environmental and toxicological impacts of decomposition products formed when the treated polymer is disposed of or burned. Thus there is a need for an effective halogen-free flame retardant.

Among alternative techniques for improving flame retardancy is the use of additives that protect by intumescence. An intumescence additive when exposed to flame, chars the polymer and generates gases forming a solid foam, creating a barrier between the air and the polymer fuel. Melamine pyrophosphate is used commercially in intumescent paints for this purpose.

Great Britain 2,272,444A discloses a non-halogenated flame retardant comprising a salt of an inorganic phosphorus-containing acid and a polymeric compound having at least ten repeat units. The flame retardant is used as an additive in polymer and coating compositions. A second phosphorus source optionally encapsulated in resin, can be combined with the flame retardant.

A variety of finely divided particulate materials has been added to polymers to modify physical properties, such as pigments, delustrants, anti-tack agents, and to impart electrical conductivity. Such particulate additives have been used in fibers, films, and molded plastics applications. Coating such fine particles prior to dispersion in the polymer has been shown to suppress chemical and photochemical reactivity between the core material of the disperse phase and the continuous polymer phase, and protect the core material from chemical exposure and degradation.

The dispersibility of solid flame retardants in polymers and the tendency for polymer degradation reactions at melt processing temperatures are unsatisfactory. These deficiencies have undesirable processing consequences. The poor dispersion properties necessitate such a high work load in extrusion processing at practical production rates that hot spots are created. In such hot zones decomposition at the polymer/additive interface can produce foaming and inferior compounded product.

The highest performance, and a desirable objective, for flame resistant molded polymers is to pass the V-0 flammability rating in the Underwriters' Laboratory Test UL-94 at a thickness of 1/16 inch (0.16 cm). A high loading of solid flame retardant is needed to meet this requirement. The high loading combined with the poor dispersibility of available solid flame retardants tends to give inconsistent results and to detract from the elongation and strength of polymer.

It is desirable to improve the performance of halogen-free flame retardant additives in polymers, improve the thermal stability of treated polymers, and lower the loading needed to meet the UL-94 V-0 standard for molded structural polymers. Such flame retardant additives are provided by the present invention. It is desirable to make flame retardant concentrates. It is also desirable to have a better process to decrease the high workload required to disperse particulate matter in polymers or to extrude the polymer itself. The present invention provides such a process.

SUMMARY OF THE INVENTION

The present invention comprises a flame retardant composition comprising coated particles, said particles having a core comprising melamine phosphate, melamine polyphosphate, melamine pyrophosphate, or mixtures thereof, said core having at least one coating comprising an organo silane, ester, polyol, dianhydride, dicarboxylic acid, melamine formaldehyde, or mixtures thereof.

The present invention further comprises a composition comprising a polymer having dispersed therein the flame retardant composition as described above.

The present invention further comprises a composition comprising a flame retardant concentrate of from about 50% to about 85% by weight of the flame retardant composition described above and from about 15% to about 50% by weight of polymer.

The present invention further comprises a composition comprising a polymer having dispersed therein a flame retardant selected from the group consisting of melamine phosphate, melamine polyphosphate, melamine pyrophosphate, and mixtures thereof, and an additive selected from the group consisting of dicarboxylic acid, dianhydride, and mixtures thereof.

The present invention further comprises a process for increasing extruder throughput of a polymer comprising adding to the polymer 1) a flame retardant composition as described above, and/or 2) an ester, polyol, dianhydride, dicarboxylic acid, melamine formaldehyde or a source of silane.

BRIEF DESCRIPTION OF THE FIGURES

In FIGS. 5, 6, 7 and 8 the presence of melamine pyrophosphate is indicated on a scale of 0% to 100% by color coded phosphorus concentration isopleths. The black area indicates low phosphate, the white area indicates high phosphate and the gray area indicates intermediate levels of phosphate.

DETAILED DESCRIPTION OF THE INVENTION

Figure 1:
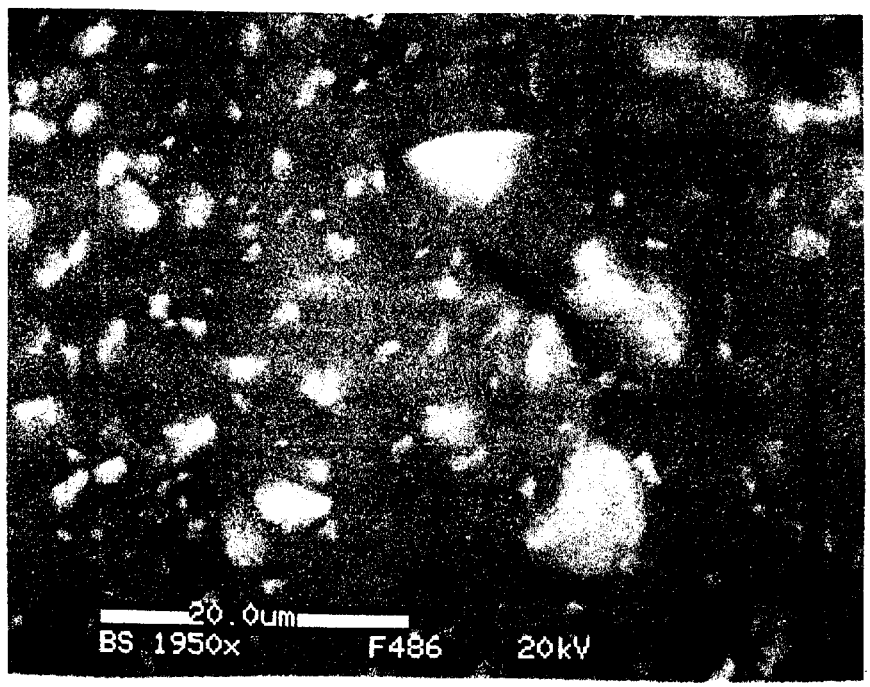
FIG. 1 is an electron micrograph of the surface of a molded bar of Example 2 of nylon-6,6 having dispersed therein melamine pyrophosphate.

This invention comprises finely divided solid flame retardants with at least one outer coating of a material that covers the flame retardant particle and is compatible with any intended polymer to which it is to be added. Such finely divided and coated flame retardant compositions are much more easily compounded with polymers for spinning and reinforced structural polymers for molding.

The coated flame retardants of this invention provide important advantages over the uncoated flame retardants of the prior art. First, the coating functions to substantially improve dispersion of the flame retardant in the polymer. Improved dispersion produces a more uniform product for critical extrusion steps and permits greatly increased extruder throughput due to the reduced work load in the extruder and the corresponding avoidance of overheating in the extruder. Second, the coating separates flame retardant and polymer, reducing the chance of reaction between polymer and flame retardant at melt processing temperatures. If such a reaction occurs, the mix can foam with deleterious results. The compositions of the present invention comprising polymer and coated flame retardant have improved flame retardancy and enhanced processibility. The combination of these effects provides so much improvement in processibility that concentrated premixes of the present invention of coated flame retardant in polymer for subsequent letdown can now be made. Such premixes facilitate the preparation of flame retardant polymers used in fibers, films and molded articles.

For polymers having a melting point much lower than the temperature at which degradation occurs in contact with the flame retardant, for instance poly(ethylene) with a melting point of about 210° C., overheating in the extruder during compounding with the flame retardant and resulting low extruder throughput is less of a problem. Nevertheless, the advantages of improved dispersion of the finely divided and coated flame retardant of this invention still provide important advantages in improved flame retardancy, lower flame retardant loading, reduced deterioration of polymer strength and elongation properties, and improved production performance.

By the term "finely divided", as used herein, is meant a solid phase reduced in size with standard equipment such as a micronizer or fluid energy mill to a particle size range of about 0.1 μm to about 50 μm. Particle size reduction and uniformity can be measured by the Microtrac as described below.

By the terms "coated" and "coating", as used herein, is meant a substantially uniform layer of the coating material covering or partially covering the surface of the core of finely divided flame retardant. The weight ratio of the coating to the coated flame retardant is as specified below. Partial coating is often sufficient.

This invention is effective with coated particulate flame retardants having a wide range of particle size. Particle size requirements for the flame retardant depend on polymer end-use. For structural or molded polymers and films, the preferred particle size is about 0.1 μm to about 50 μm in diameter and, most preferably, about 0.1 μm to about 20 μm. For spun fibers the preferred particle size is about 0.1 μm to about 8 μm in diameter and most preferably about 0.1 μm to about 3 μm. Such particle sizes can be obtained by conventional micronizing of commercial materials. The commercial materials as received are typically 20 μm to 400 μm in diameter. Coarse material may be sonicated to provide an indication of the extent to which it can be deagglomerated of the flame retardant as received, and to give an indication of ease of micronizing. Sonication is a laboratory process in which ultrasound is used to break up agglomerates and thus to predict the effect of micronizing. The adequacy of size reduction following micronizing may be verified using equipment such as the Microtrac (from Leeds and Northrup Co., St. Petersburg Fla.). The Microtrac is run on full range analyzer (700 μm–1 μm) using light scattering technology and is based on forward and wide-angle light scattering with Mie corrections.

Flame retardant particle size reduction alone, without the coating, provides improvement in dispersibility and subsequent processibility. However the combination of reduced flame retardant particle size and coating on said particles provides greater improvement in dispersability and processibility. The core comprises from about 94 to about 99.9 weight percent of the composition, and the coating comprises from about 0.1 to about 6.0 weight percent of the composition.

Materials suitable as the flame retardant core are melamine phosphate, melamine pyrophosphate, melamine polyphosphate, and mixtures thereof. Most preferred are melamine pyrophosphate and melamine polyphosphate. Melamine polyphosphate is prepared by heating melamine pyrophosphate under nitrogen at 290° C. to constant weight. Melamine pyrophosphate is available commercially as melamine pyrophosphate Grade AC-2 from Anhydrides and Chemicals Inc., Newark, N.J. or can be synthesized in accordance with U.S. Pat. No. 3,914,193. Melamine phosphate is available commercially from Albright and Wilson, Charlestown, S.C.

The outer coating is comprised of one or more compounds which cover or partially cover the surface of the flame retardant particle and lower the surface tension of the particle surface to a value closer to the surface tension of the polymer. Such coating compounds comprise organo silanes such as alkyl silanes, amino silanes, mixtures of alkyl silanes and polysiloxanes; esters; polyols; dicarboxylic acids; aromatic or aliphatic dianhydrides; melamine formaldehyde; and mixtures thereof.

Examples of suitable alkyl silanes have the formula:

wherein

R is an amino group or a nonhydrolyzable aliphatic, cycloaliphatic, or aromatic having 1 to about 20 carbon atoms;

$R_1$ is a hydrolyzable group such as an alkoxy, halogen, acetoxy or hydroxy or mixtures thereof; and x=1 to 3.

For example, silanes useful in coatings in the invention include aminosilanes, aminopropyltriethoxysilane, aminopropyltrimethoxysilane, hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Additional examples of silanes include those with R having 8–18 carbon atoms; $R_1$ being chloro, methoxy, hydroxy or mixtures thereof; and with x=1 to 3. Mixtures of silanes are also suitable. Preferred silanes are those with R having 8–18 carbon atoms, $R_1$ being ethoxy, and x=1 to 3. Most preferred is octyl silane or octyltriethoxysilane.

The weight content of the silane, based on the total coated flame retardant is typically about 0.1% to about 5% by weight, preferably about 0.1% to about 1% by weight. More than 2% by weight may be used but no particular advantage is observed.

In an alternative embodiment, a mixture of at least one silane with at least one polysiloxane is useful as a coating compound in carrying out the invention. Suitable polysiloxanes have the formula:

$$[(R_2)_n SiO_{4-n/2}]_m$$

wherein $R_2$ is an organic or inorganic group, n is 1 to 3, and m is an integer greater than 2, provided that when n=3, m is 2.

For example, polydimethylsiloxane (PDMS), vinyl phenylmethyl terminated dimethylsiloxanes, divinylmethyl terminated polydimethylsiloxane and the like are suitable polysiloxanes. PDMS is a preferred polysiloxane. The silanes useful in the mixture of the silanes described above. Silanes wherein R has 1–8 carbon atoms; $R_1$ is alkoxy and x is 1 are preferred.

The weight content of the silane and polysiloxane, based on total coated flame retardant, is about 0.3% to from about 5.0% by weight, and preferably from about 1.0% to 2.5% by weight. Especially preferred is about 0.5% to about 1.0% by weight silane wherein R has 4 or 8 carbon atoms, $R_1$ is alkoxy, x is 1, and 1% by weight PDMS. The ratio of silane to polysiloxane is 1:2 to 2:1. An especially preferred ratio of silane to polysiloxane is 1:1.

Examples of esters useful as coating compounds in the present invention are esters of difunctional $C_6$–$C_{40}$ aliphatic and aromatic carboxylic acids and triesters of phosphoric acid. Examples of esters of difunctional $C_6$–$C_{40}$ aliphatic and aromatic carboxylic acids include dioctyl azelate, dialkyl phthalate, dialkyl adipate, dialkyl sebacate, dioctyl terephthalate, dinonyl phthalate, di-iso-octyl phthalate, di-iso-octyl sebacate, polypropylene adipate, polypropylene laurate, polypropylene sebacate, benzyl butyl phthalate, dibutyl phthalate, dibutyl adipate, dibutyl sebacate, dihexyl adipate, dihexyl sebacate, dihexyl phthalate, dicyclohexyl phthalate, dicyclohexyl sebacate, diphenyl adipate, diisoctyl adipate. Examples of triesters of phosphoric acid include tritolyl phosphate, trixylyl phosphate, trioctyl phosphate, and tricresyl phosphate. Most preferable is di(n-octyl) azelate, di(2-ethylhexyl) azelate and mixtures thereof.

Examples of polyols suitable for use as coating compounds include triethanolamine, trimethylolpropane, and trimethylolethane. Examples of suitable dicarboxylic acids for use as coating compounds herein are the aliphatic dicarboxylic acids. Particularly preferred is dodecanedioic acid. Dianhydrides suitable for use as coatings include aromatic dianhydrides and aliphatic dianhydrides. Preferred is pyromellitic dianhydride. Various esters such as dioctylazelate are available commercially from Aldrich Chemical Company, Inc., Milwaukee, Wis. Melamine formaldehyde is available from BTL Specialty Resins Corporation, Toledo, Ohio. Polyols, dicarboxylic acids, and dianhydrides are also available commercially, such as from Aldrich Chemical Co., 101 West St. Paul Ave., Milwaukee, Wis.

Silanes and polysiloxanes are commercially available or can be prepared by processes known in the art such as those described in "Organosilicon Compounds", S. Pawlenko, et al., New York (1980).

The ester, polyol, dianhydride, melamine formaldehyde or dicarboxylic acid coating material is applied to the finely divided flame retardant in an amount sufficient to give a coated flame retardant containing about 0.1% to about 6% by weight of core particle, and preferably about 0.1% to 1.0% by weight of the coating material.

The coating does not significantly alter the particle size diameter of the flame retardant. When silanes are employed the coating thickness is typically a monomolecular layer.

The coating material is optionally diluted or extended with a volatile solvent for ease of application to the finely divided flame retardant particle, and the solvent subsequently removed. The selection of compatible volatile solvents for reactive silanes is well known to those skilled in the art. The solvent is selected so that it does not react with the core material. Additionally, the coating material and the flame retardant may be fed together to a micronizer used to reduce particle size. Under such conditions any volatile solvent used, such as ethanol, is vaporized and removed in the hot micronizer. Other methods well known to those skilled in the art may be used for applying the coatings of this invention, such as injectors or fluidized beds.

The coated finely divided flame retardant of this invention also optionally has one or more additional coating layers between the flame retardant and the outer coating. Intermediate coatings are comprised of the same materials used for the outer coating as previously described, or such intermediate coating layers are used to enhance performance. For example, a synergist is employed to enhance flame retardancy. Examples include synergists to provide additional water, additional blowing agent and additional char. Choice of synergists is carefully made at higher processing temperatures. Such synergists and their choice are well known in the art. The outer coating is applied after the application of the synergist or other intermediate coating.

The present invention further comprises the coated finely divided flame retardant of this invention dispersed in a polymer. The polymer is present at from about 80 to about 95 weight percent of the composition and the flame retardant is present at from about 5 to about 20 weight percent of the composition. Such compositions are typically prepared to be spinnable or to provide a structural or moldable composition.

The composition contains an optional reinforcing agent. When present, the reinforcing agent is present at from about 5 to about 30 weight percent, the flame retardant is present at from about 10 to about 50 weight percent, and the polymer is present at from about 20 to about 85 weight percent. Suitable reinforcing materials include glass, carbon, aramid fibers, or mica. Such moldable compositions can meet the UL-94 V-0 flammability standard. Reinforcing material is typically used in molded polymers to improve physical properties.

It is further understood that the composition optionally contains other additives in addition to the coated flame retardants and reinforcing materials, such as antioxidants, ultra-violet light stabilizers, additives to improve the comparative tracking index (an electrical property), processing additives, and other additives used by those skilled in the art.

Preferred processing aids include dodecanedioic acid, pyromellitic dianhydride, or terephthalic acid.

Suitable polymers include polyamides, polyesters, polyacrylates, polymethacrylates, polymers of ethylenically unsaturated monomers including olefins such as polyethylene, polypropylene, polybutylene, copolymers of ethylene with higher olefins such as alpha olefins containing 4 to 10 carbon atoms or vinyl acetate, and the like, vinyls such as polyvinyl chloride, polyvinyl esters such as polyvinyl acetate, polystyrene, acrylic homopolymers and copolymers, phenolics, alkyds, amino resins, epoxy resins, polyurethanes, phenoxy resins, polysulfones, polycarbonates, polyesters and chlorinated polyesters, polyethers, acetal resins, polyimides, polyoxyethylenes, various rubbers and/or elastomers either natural or synthetic, polymers based on copolymerization, grafting, or physical blending of various diene monomers with the above-mentioned polymers. Also included are copolymers of any of the above.

Preferred polymers are polyamides such as nylon-6; nylon-6,6; nylon-6,12 and high temperature nylon; aromatic polyamides (aramids), such as poly(m-phenylene-isophthalamide) commercially available as NOMEX and poly(p-phenylene terephthalamide) commercially available as KEVLAR (both from E. I. du Pont de Nemours and Co., Wilmington, Del.); polyesters such as poly(butylene terephthalate) and poly(ethylene terephthalate); poly(ethylene); poly(propylene); polyacrylate; and polymethacrylate compositions such as CORIAN, (a filled poly(methylmethacrylate) from E. I. du Pont de Nemours and Co., Wilmington, Del.).

The coated particulate flame retardant is dispersed within the polymer using the process of the present invention as described below. Generally, thorough mixing of the coated flame retardant and polymer, typically followed by drying by heating, is then followed by extrusion. A twin screw extruder can be employed and the throughput adjusted according to the polymer used to maximize speed while avoiding overheating to a temperature detrimental to the desired polymer properties.

This invention further comprises flame retardant concentrates. Such concentrates comprise the coated flame retardants of this invention dispersed in the above-listed polymers such that the resulting compounded mixture contains from about 50% to about 85% of flame retardant by weight and from about 15% to about 50% by weight of the polymer. Such predispersed flame retardant concentrates facilitate subsequent letdown with additional polymer and optionally added reinforcement to give the compositions described above. The concentrates are prepared using the process of the present invention as described below.

The size reduction of, and coatings applied to, commercially available solid flame retardants, such as melamine pyrophosphate powders, significantly improve the performance of the flame retardant in polymers and improves the dispersion of the solid flame retardant in the polymers. The coating provides a barrier between the core and the polymer that inhibits polymer degradation reactions of flame retardant with the polymer at high processing temperatures (for example greater than 300° C.). The improved dispersion and performance of coated flame retardant in polymers is so effective that reduced levels of flame retardant are used to pass the UL-94 test. The reduced flame retardant loading is an advantage in both maintaining the desired physical properties of the polymer and achieving flame retardancy at reduced cost.

Use of commercially available melamine pyrophosphate is preferred over melamine phosphate as the phosphate starts to release water at the melt or extrusion temperatures of some polymers, reducing the strength of the extruded, spun, or molded product. The tendency to release moisture under melt conditions can be further reduced by converting the melamine pyrophosphate to melamine polyphosphate before size reduction and coating. Coated melamine pyrophosphate is preferred for polymer processing temperatures below about 300° C. due to its commercial availability. Coated melamine polyphosphate is preferred for higher polymer processing temperatures and can be used where the polymer processing temperature is greater than 320° C.

The present invention further comprises a composition comprising a polymer having dispersed therein an uncoated particulate flame retardant and a processing additive. This flame retardant is selected from the group consisting of melamine phosphate, melamine polyphosphate, melamine pyrophosphate, and mixtures thereof. The additive is selected from the group consisting of a dicarboxylic acid, a dianhydride, and mixtures thereof.

The uncoated flame retardant is commercially available or is prepared as previously described. The flame retardant is used in commercially available grades as purchased, or can alternatively be reduced in size to a particle size range of from about 0.1 $\mu$m to about 50 $\mu$m using standard equipment such as a micronizer or fluid energy mill. Preferred for use herein is melamine pyrophosphate in commercially available grades.

The additive is a dicarboxylic acid or dianhydride or a mixture thereof. Examples of suitable dicarboxylic acids include aliphatic dicarboxylic acids having 1 to about 20 carbon atoms. Preferred for use herein is dodecanedioic acid. Suitable dianhydrides include aromatic dianhydrides and aliphatic dianhydrides. Preferred are pyromellitic dianhydride and 1,4,5,8-naphthalene tetracarboxylic dianhydride. These dicarboxylic acids and dianhydrides are commercially available from Alrich Chemical Company, Milwaukee, Wis.

Suitable polymers for use in the compositions of this invention containing uncoated flame retardants include all those polymers previously described for use with the coated flame retardants of this invention. Preferred polymers are polyamides such as nylon-6; nylon-6,6; nylon-6,12 and high temperature nylon; aromatic polyamides (aramids), such as poly(m-phenylene-isophthalamide) commercially available as NOMEX and poly(p-phenylene terephthalamide) commercially available as KEVLAR (both from E. I. du Pont de Nemours and Co., Wilmington, Del.); polyesters such as poly(butylene terephthalate) and poly(ethylene terephthalate; poly(ethylene); poly(propylene); polyacrylate; and polymethacrylate compositions such as CORIAN, (a filled poly(methylmethacrylate) from E. I. du Pont de Nemours and Co., Wilmington, Del.).

The compositions of the present invention containing uncoated flame retardants are prepared by mixing the flame retardant and the additive and dispersing the mixture within the polymer using the process of the present invention as described below. Generally, thorough mixing of the flame retardant and polymer, typically followed by drying by heating, is then followed by extrusion using conventional equipment. Alternatively the additive can be added during extrusion.

The compositions containing uncoated flame retardant optionally contain routine additives such as reinforcing materials, antioxidants, ultra-violet light stabilizers, additives to improve the comparative tracking index, processing additives, and other additives used by those skilled in the art. Synergists are also optionally present. Examples include synergists to enhance flame retardancy, or to provide additional water, additional blowing agent or additional char. Such synergists and their choice are well known in the art.

These compositions containing uncoated flame retardants provide acceptable levels of flame retardancy and improved processing. The presence of the dicarboxylic acid or dianhydride permits faster extrusion due to reduced workload at lower temperatures and thus leads to economic advantages in manufacturing processes.

The present invention further comprises a process for increasing extruder throughput of a polymer comprising adding to the polymer prior to or during extrusion an additive selected from at least one of the group of an organo silane, ester, polyol, dianhydride, dicarboxylic acid, melamine formaldehyde, mixtures thereof, and the coated flame retardant as described above. Thus faster extrusion is achieved by adding either the solid coated flame retardant of the present invention, or any of the materials used as coatings for said flame retardant without the core material, or mixtures thereof.

The increased extruder throughput is defined compared to extruder throughput of the same polymer containing no additive. Typically such throughput is measured in kg or pounds per hour and increases of at least about 10% are achieved using the additives defined in the present process. The process permits faster extrusion operation while minimizing the usual increase in temperature that results from increasing extruder speed. Thus, for a particular polymer, faster extrusion can be conducted while staying below its degradation temperature. The temperature of product exiting the extruder can be maintained at a level which is not adverse to the desired physical and chemical properties of said product while maximizing extruder speed. This provides economic advantages in increased efficiency. For example, for many polymers maintaining the temperature of the product exiting the extruder below about 340° C. is desirable.

Polymers suitable for use in the process of the present invention include those previously listed for use in the flame retardant of the present invention. Preferred are polyester, polyamide, polyethylene, polypropylene, polyacrylate and polymethacrylate. Especially preferred are polybutylene terephthalate, polyethylene terephthalate, poly methylmethacrylate, nylon-6, nylon-6,6, nylon-6,12, high temperature nylon or copolymers of nylon-6 and nylon-6-6. The materials suitable for use as additives in this process include the coated flame retardant as described above and the silanes, esters, polyols, dianhydrides, dicarboxylic acids, and melamine formaldehyde previously detailed above as coating materials, or mixtures thereof. The additive is chosen which does not cause adverse effects to the polymer properties desired in a particular situation. The amount of additive employed ranges from about 0.1 to 8 weight percent, and is optimized based on the particular polymer used and its desired properties after extrusion.

The additive is mixed with the polymer prior to or during extrusion. Coextrusion is also suitable. Other typical polymer additives such as reinforcing agents, antioxidants, ultraviolet light stabilizers, additives to improve comparative tracking index, processing additives and other known additives are optionally present during extrusion or can be added during or after extrusion as desired.

In the process of the present invention the additive, usually in particulate form, is mixed thoroughly with the polymer using conventional mixing equipment. The mixture is then dried, usually by heating. The mixture is then fed into the extruder and extruder speed adjusted to maximize throughput while maintaining the temperature of the product exiting the extruder below the polymer melting temperature or below a temperature detrimental to the desired product properties. A twin screw or other conventional extruder is used. Alternatively the polymer and additive can be dried and then coextruded, or the additive metered in during extrusion. The additive decreases the workload at practical production rates. The decrease in workload enables an increase in the speed of extruder throughput while avoiding development of hot spots. This provides an economic advantage by increased efficiency of the extrusion operation.

Test Methods

Method 1—Underwriters' Laboratories UL-94 Flammability Test

A 5-inch by ½-inch (12.7 by 1.27 cm) molded bar, ¹⁄₁₆th inch (0.16 cm) in thickness was mounted vertically and flamed twice (1st and 2nd application) and the duration of the each subsequent burning period measured. The test was made on five bars. A V-0 rating requires a total flaming time from the five tests to be less than 50 seconds, with no bar burning for greater than 10 seconds and no ignition of a cotton pad placed below the bar due to melted and burning material. The full details for the testing procedure and the less stringent requirements for V-1 and V-2 ratings are detailed in the UL-94 Test Specifications.

Reinforcing material is included in the bars used for the UL-94 flame retardancy tests as it prevents or reduces the tendency of the polymer sample to melt and drip during testing. Dripping may act to carry away heat from the sample and improve the flame retardancy rating. However if the drips are burning, the cotton pad placed beneath the sample may be ignited, giving a poorer flame retardancy rating.

Other Methods—Instron measurements of physical properties are well known to those skilled in the art. Determination of particle size distributions using the Microtrac equipment are made according to the equipment manufacturer's instructions.

EXAMPLES

Example 1

Preparation of Coated Samples of Melamine Pyrophosphate

Octyltriethoxysilane (23 g) available from OSi Specialties, 495 Old Connecticut Path, Framington, Mass. was dissolved in ethanol (23 g) and the solution placed in a spray bottle. Melamine pyrophosphate (2.3 kg) Grade AC-2 (from Anhydrides & Chemicals, Inc., Newark, N.J.) was placed in a plastic bag and repeatedly sprayed with 5 g portions of the ethanolic solution, the bag being thoroughly shaken after each spraying. The sprayed melamine pyrophosphate was dried in an oven at 120° C. for 4 hours, passed through a 20 mesh screen (a wire screen with 20 wires per 2.54 cm), and micronized to a particle size, as measured by a Microtrac, of 0.1 $\mu$m to 20 $\mu$m, yielding melamine pyrophosphate coated with 1% octyltriethoxysilane.

Example 2

Preparation of the Flame Retardant-Treated Compositions of Nylon-6,6 for Testing Ground resin, 52 parts by weight of ZYTEL 101 DP [Nylon-6,6] available from E. I. du Pont de Nemours and Company, Wilmington, Del. and melamine pyrophosphate coated with 1% octyltriethoxysilane prepared as described in Example 1 (28 parts by weight) were thoroughly mixed for 30 minutes, dried at 70° C. for 10 hours under 25 inches of Hg vacuum (17 kPa) and then extruded on a 30 mm Werner and Pfleiderer twin screw extruder (from Werner & Pfleiderer, Stuttgart, Germany or Ramsey N.J.) using a screw design having a mid-range screw severity at melt temperatures of 300° C. and at rates of 15.9 kg/hour. PPG 3540 glass reinforcing fibers (20 parts by weight) available from PPG Company, Pittsburgh, Pa. were mixed into the resin mixture in the extruder. The resin mixture was molded into bars using typical laboratory size injection molding machines (e.g., from Van Dorn Plastic Machinery Co., Cleveland Ohio), with melt temperatures of 280° C. to 300° C. and mold temperatures ranging from 50° C. to 100° C. Two additional molding compound mixtures were prepared and molded using 1) melamine pyrophosphate, micronized but uncoated, and 2) melamine pyrophosphate as purchased. The molded bars were then tested for a flammability rating using the UL-94 test and bars of ¹⁄₁₆ inch (0.16 cm) thickness as previously described in Test Method 1. The UL-94 test results are shown in the Table I below.

TABLE I

| Sample (5 bars each) | Burning Time, 1st and 2nd Flame Applications (sec) | | | | UL-94 Rating* |
|---|---|---|---|---|---|
| | 1st | 2nd | Total | Average* | |
| 1) Melamine Pyrophosphate (MPP) as sold, Grade AC-2 | 2 | 2 | 4 | | |
| | 14 | 2 | 16 | | |
| | 10 | 3 | 13 | | |
| | 10 | 3 | 13 | | |
| | 2 | 1 | 3 | | |
| | | | 49 | 10 | V-1 |
| 2) Micronized MPP Grade AC-2 | 0 | 4 | 4 | | |
| | 0 | 10 | 10 | | |
| | 0 | 4 | 4 | | |
| | 1 | 8 | 9 | | |
| | 1 | 4 | 5 | | |
| | | | 32 | 6.4 | V-0 |
| 3) Micronized MPP Grade AC-2 and coated with octyltri- ethoxysilane | 0 | 0 | 0 | | |
| | 0 | 1 | 1 | | |
| | 0 | 3 | 3 | | |
| | 0 | 2 | 2 | | |
| | 2 | 3 | 5 | 2.2 | V-0 |

Bar dimensions: 12.7 × 1.27 × 0.16 cm (5 × ½ × ¹⁄₁₆ inches) in thickness.
Bar composition by weight as in Example 2: 28% melamine pyrophosphate, 20% glass, 52% nylon-6,6.
*None of the 5 bars may burn longer than 10 sec. to meet UL-94 rating of V-0.

Figure 2:
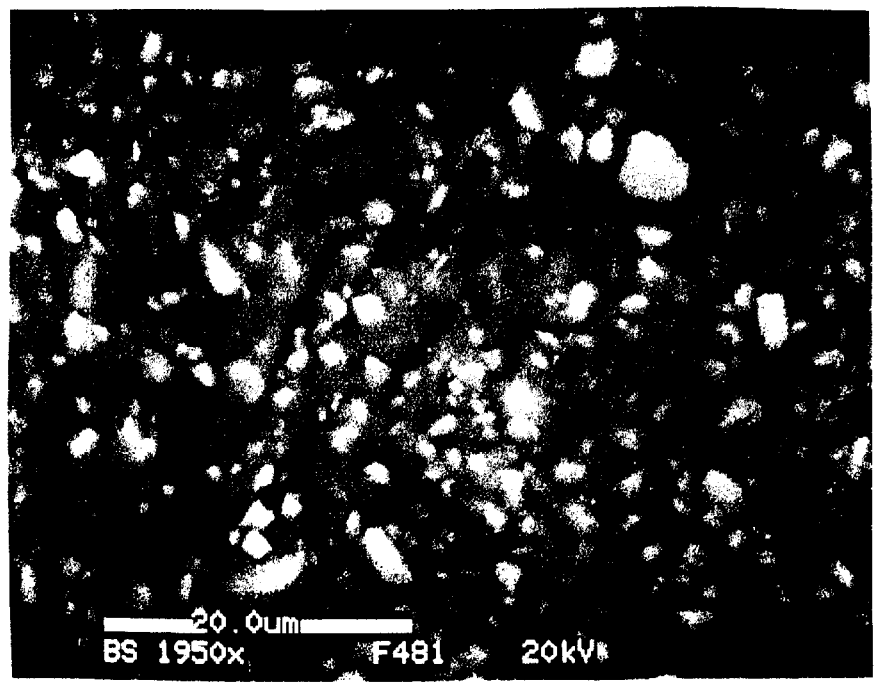
FIG. 2 is an electron micrograph of the surface of a molded bar of Example 2 of glass reinforced nylon-6,6 having dispersed therein melamine pyrophosphate coated with octyltriethoxysilane.
Figure 3:
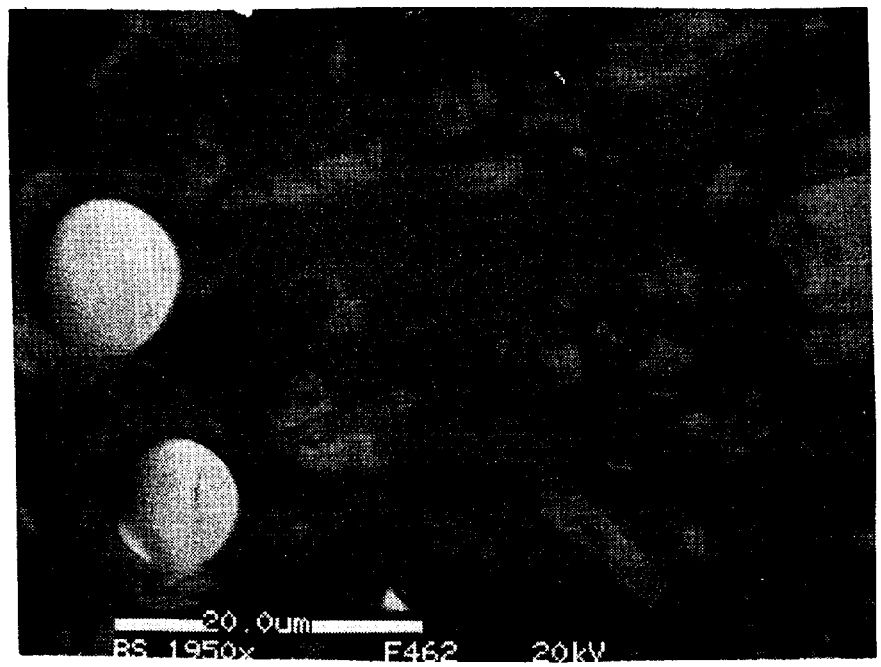
FIG. 3 is an electron micrograph of a cross section of a molded bar of Example 2 of nylon-6,6 having dispersed therein melamine pyrophosphate.
Figure 4:
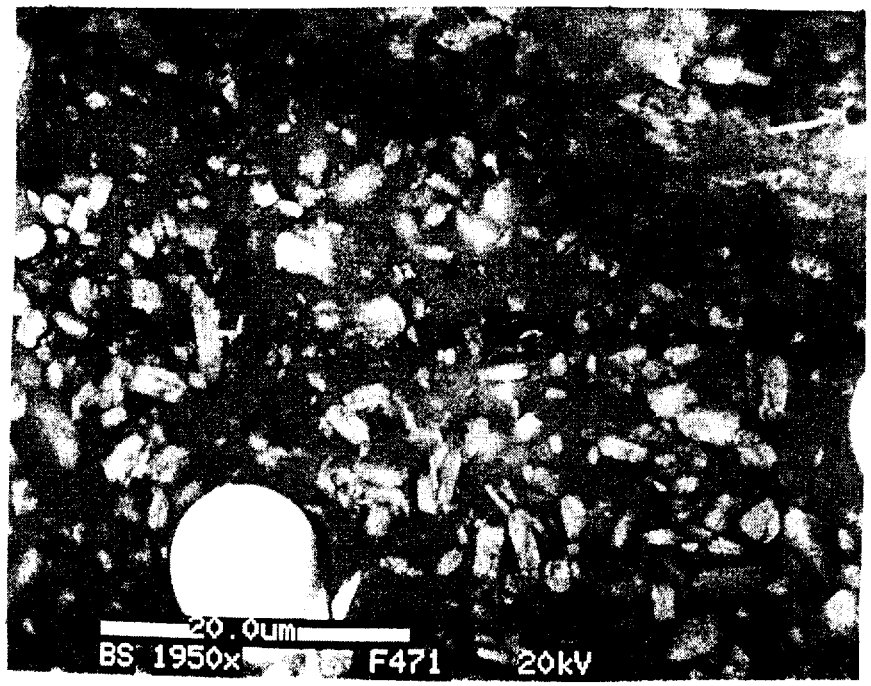
FIG. 4 is an electron micrograph of a cross section of a molded bar of Example 2 of glass reinforced nylon-6,6 having dispersed therein melamine pyrophosphate coated with octyltriethoxysilane.

High resolution electron microscopy was conducted on the surface and cross section of the molded bars. FIG. 1 and FIG. 2 show the electron micrograph of the surface. FIG. 1 is of the surface of a molded bar of glass reinforced nylon-6,6 having dispersed therein melamine pyrophosphate as purchased denoted as Sample 1) in Table I. FIG. 2 is of a molded bar of glass reinforced nylon-6,6 having dispersed therein melamine pyrophosphate coated with octyltriethoxysilane denoted as Sample 3) in Table I. FIG. 3 is an electron micrograph of a cross section of Sample 1). FIG. 4 is an electron micrograph of a cross section of Sample 3). The improvement in dispersibility when coated melamine pyrophosphate was used is clearly shown by a comparison of FIGS. 1 and 2. FIG. 1 shows a large particle size and poor distribution, while FIG. 2 shows finer particle size and improved distribution. Likewise the improvement in dispersibility is shown by a comparison of FIGS. 3 and 4. The large circles in both FIGS. 3 and 4 represent the glass fiber. However, FIG. 3 shows large particle size and poor distribution, while FIG. 4 shows finer particle size and improved distribution.

Figure 5:
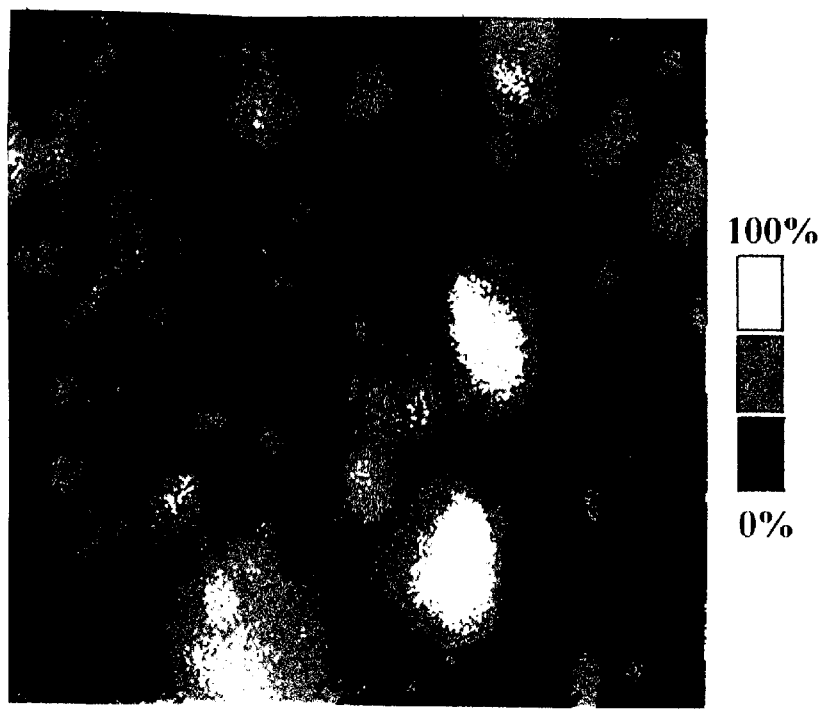
FIG. 5 is an electron micrograph of phosphate distribution on the surface of a molded bar of Example 2 of nylon-6,6 having dispersed therein melamine pyrophosphate.
Figure 6:
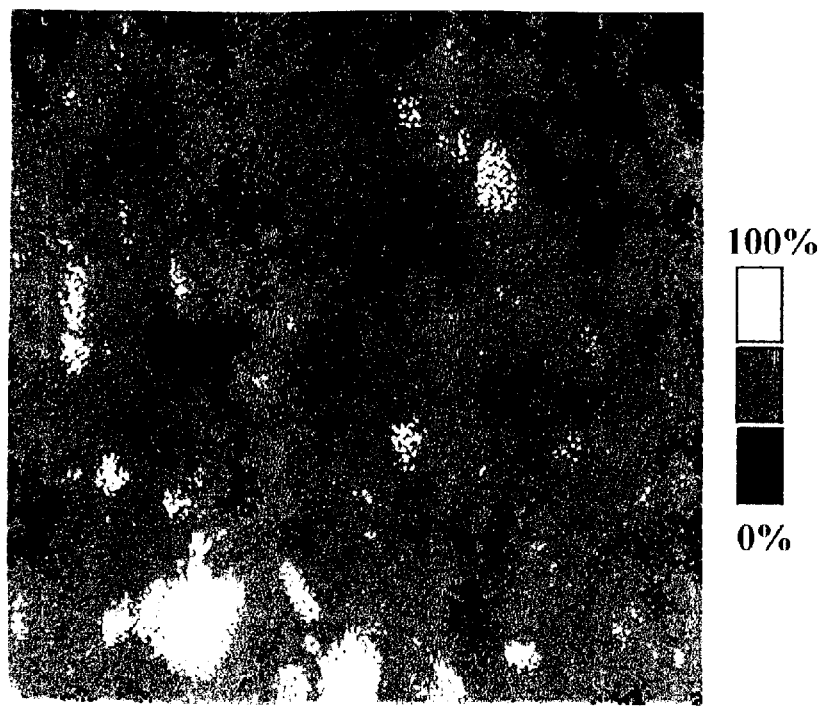
FIG. 6 is an electron micrograph of phosphate distribution of the surface of a molded bar of Example 2 of glass reinforced nylon-6,6 having dispersed therein melamine pyrophosphate coated with octyltriethoxysilane.
Figure 7:
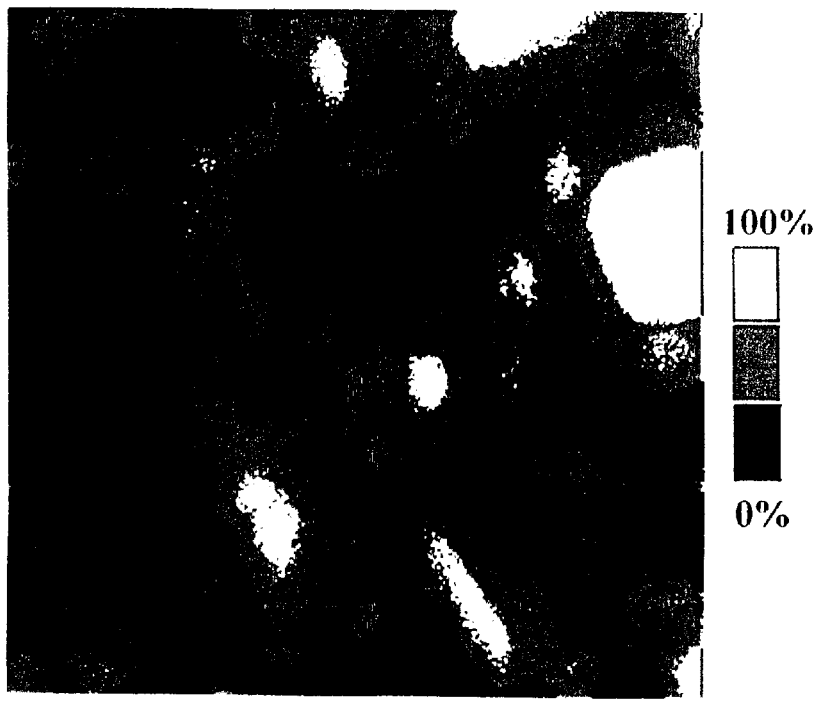
FIG. 7 is an electron micrograph of phosphate distribution in a cross section of a molded bar of Example 2 of nylon-6,6 having dispersed therein melamine pyrophosphate.
Figure 8:
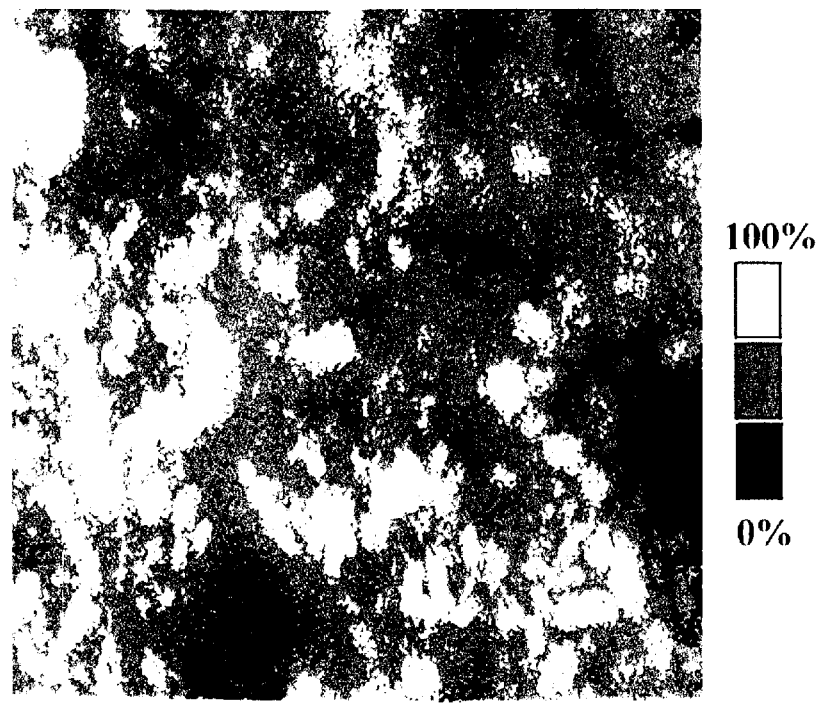
FIG. 8 is an electron micrograph of phosphate distribution in a cross section of a molded bar of Example 2 of nylon-6,6 having dispersed therein melamine pyrophosphate coated with octyltriethoxysilane.

FIG. 5 is an electron micrograph of the phosphate distribution on the surface of the molded bar of glass reinforced nylon-6,6 having dispersed therein melamine pyrophosphate as denoted as Sample 1) in Table I. FIG. 6 is an electron micrograph of the phosphate distribution on the surface of the molded bar of glass reinforced nylon-6,6 having dispersed therein melamine pyrophosphate coated with octyltriethoxysilane as denoted as Sample 3) in Table I. FIG. 7 is an electron micrograph of the phosphate distribution of a cross section of Sample 1). FIG. 8 is an electron micrograph of the phosphate distribution of a cross section of Sample 3). For FIGS. 5 through 8 the presence of melamine pyrophosphate is indicated on a scale of 0% to 100% by a computer generated map showing phosphorus concentration isopleths. Black indicates a low level of phosphorus as represented by melamine pyrophosphate, gray indicates an intermedicate level of phosphorus as represented by melamine pyrophosphate, and white indicates a high level of phosphorus as represented by melamine pyrophosphate. A comparison of FIGS. 5 and 6 shows better dispersion of a higher level of melamine pyrophosphate in FIG. 6, for which the melamine pyrophosphate was coated in accordance with the present invention. A comparison of FIGS. 7 and 8 shows better dispersion of a higher level of melamine pyrophosphate in FIG. 8 for which the melamine pyrophosphate was coated in accordance with the present invention.

Example 3

Ninety grams melamine formaldehyde (BTL Specialty Resins Corp., Toledo, Ohio) were placed in 12 liters deionized water contained in a 13 liter container. With stirring, the system was heated to 85° C. wherein the melamine formaldehyde was dissolved. 3000 grams melamine pyrophosphate powder was added over a ten minute period. The system was cooled while stirring over a 2 hour period. The melamine formaldehyde coated melamine pyrophosphate was placed on a filter to separate the solids from the slurry. 30 grams of octyl silane was added to 100cc of methanol. The octyl silane/methanol solution was mixed with the wet-cake of melamine formaldehyde-coated melamine pyrophosphate. The system was dried at 120° C. for 4 hours, and the resulting product was passed through a 40 mesh sieve. The coated particles were dried, micronized until the particle size, as measured by Microtrac, was 0.1 to 20$\mu$m and dispersed in nylon-6,6 as described in Example 2. Uncoated melamine pyrophosphate was also dispersed in nylon-6,6 for comparison. The resulting compositions were then subjected to thermogravimetric analysis, heating to 320° C. at a rate of 10° C. per minute. The resulting data, shown in Table II, demonstrates the stability of the particles to elevated temperature.

TABLE II

| Sample | Weight retained at 320° C. |
|---|---|
| 1) 100% nylon-6,6 | 99% |
| 2) 67% nylon-6,6 33% MPP* | 97.3% |
| 3) 67% nylon-6,6 33% MPP coated with octylsilane | 98.5% |
| 4) 67% nylon-6,6 33% MPP coated with MF** and octyl silane | 98.4% |

*MPP is melamine pyrophosphate.
**MF is melamine formaldehyde.

Example 4

Melamine pyrophosphate was coated with octylsilane (1% by weight relative to melamine pyrophosphate) as in Example 1, and a second coating of melamine formaldehyde was applied as in Example 3. Melamine pyrophosphate was coated with aminosilane (1% by weight relative to melamine pyrophosphate), as in Example 1. The coated samples were dried, separately micronized and mixed with dodecanedioic acid. The aminosilane was a mixture of gamma-aminopropyltriethoxysilane and gamma-aminopropyltrimethoxysilane from OSi Specialties, Framington, Mass. Those aminosilane coated samples were dried and mixed with dodecanedioic acid. The particles were dispersed in nylon-6,6 reinforced with glass fibers (PPG3540 available from Pittsburgh Plate and Glass, Pittsburgh, Pa.) as described in Example 2. Uncoated melamine pyrophosphate was also dispersed in nylon-6,6 for comparison. The resulting compositions were analyzed for tensile strength using the ASTM-D638 method, molded into bars as in Example 2, and subjected to flammability testing using Test Method 1 as previously described. The resulting data in Table III demonstrates that the micronized and coated melamine pyrophosphate did not adversely affect polymer properties.

TABLE III

| Sample | Tensile Strength, Pa | Elongation % | UL-94 Rating |
|---|---|---|---|
| 1) 49.75% nylon-6,6 25% glass 0.25% dodecanedioic acid 25% MPP* coated with octylsilane and MF**, micronized | 147187 × 10³ | 2.07 | V-1 |
| 2) 44.75% nylon-6,6 25% glass 0.25% dodecanedioic acid 30% MPP coated with octylsilane and MF, micronized | 140148 × 10³ | 2.145 | V-0 |
| 3) 49.50% nylon-6,6 25% glass 0.25% dodecanedioic acid 0.25% PMDA*** 25% MPP uncoated unmicronized | 138914 × 10³ | 1.94 | V-0 |
| 4) 44.75% nylon-6,6 25% glass 0.25% dodecanedioic acid 30% MPP coated with aminosilane unmicronized | 131530 × 10³ | 1.755 | V-0 |

*MPP is melamine pyrophosphate
**MF is melamine formaldehyde
***PMDA is pyromellitic dianhydride Example 5

Polybutylterephthalate (Valox 307 available from General Electric Company, Pittsfield, Mass.) was mixed with melamine pyrophosphate and a mold release (Loxiol 7119 available from Henkel Co., LaGrange, Ill.) in amounts to prepare compositions having weight percent components as shown in Table IV. The compositions were dried at 10° C. for 4 hours under vacuum. Attempts to extrude the mixtures on a 30 mm Werner and Pfleiderer twin screw extruder (from Werner and Ffleiderer, Stuttgart, Germany) were unsuccessful. Pyromellitic dianhydride was then added to the two compositions at a level of 0.35% by weight. The compositions were then easily extruded at rates of 13.6 kg/hr. Glass reinforcing fibers (PPG 3563 available from Pittsburgh Plate and Glass, Pittsburgh, Pa.), were mixed into the resin mixture in the extruder. The extruded compositions were molded into bars as in Example 2 and subjected to flammability testing using Test Method 1 as previously described. As shown in Table IV, UL-94 ratings of V-0 were obtained.

TABLE IV

| SAMPLE, wt % | 1 | 2 | 3 | 4 |
|---|---|---|---|---|
| Valox 307 | 39.4 | 41.4 | 39.3 | 41.3 |
| PPG3540 | 20 | 20 | 19.9 | 19.9 |
| MPP* | 40 | 38 | 39.9 | 37.9 |
| Loxiol 7119 | 0.6 | 0.6 | 0.6 | 0.6 |
| PMDA** | 0.0 | 0.0 | 0.3 | 0.3 |
| UL-94 Rating | | | V-0 | V-0 |

*MPP is melamine pyrophosphate
**PMDA is pyromellitic dianhydride

Example 6

Nylon-6,6 (ZYTEL 101DP available from E. I. du Pont de Nemours and Company, Wilmington, Del.) was thoroughly mixed for 15 minutes with melamine pyrophosphate (MPP) from Anhydrides & Chemicals, Newark, N.J., dodecanedioic acid (DDDA), pyromellitic dianhydride (PMDA), 1,4,5,8-naphthalene tetracarboxylic dianhydride (NTDA), phthalic anhydride (PA), each available from Aldrich Chemical Co., Milwaukee, Wis. and Acrawax C available from Wittco Co., Houston, Tex. in amounts to prepare compositions having weight percent components as shown in Table V. The compositions were dried and extruded with addition of glass reinforcing fibers (PPG 3540) from Pittsburgh, Plate Glass, Pittsburgh, Pa. as in Example 5. Attempts to extrude sample 1 were unsuccessful. Sample 7 was badly degraded after extrusion. The remaining samples were extruded molded into bars as in Example 2 and subjected to flammability testing using Test Method 1 as previously described. Ratings are listed in Table V. This data demonstrates the processing effect of the various types of additives tested. The reduction in temperature of the material exiting the extruder from 323° C. (sample 1 with no additive) to lower temperatures (samples 2–7) is important to improved processing.

TABLE V

| SAMPLE, WT % | 1 | 2 | 3 | 4 | 5 | 6 | 7 |
|---|---|---|---|---|---|---|---|
| Nylon-6,6 | 49.75 | 49.45 | 49.03 | 49.20 | 49.18 | 49.20 | 49.02 |
| glass | 25 | 25 | 25 | 25 | 25 | 25 | 25 |
| MPP | 25 | 25 | 25 | 25 | 25 | 25 | 25 |
| DDDA | 0 | 0 | 0.18 | 0.25 | 0.57 | 0.25 | 0 |
| PMDA | 0 | 0.30 | 0.54 | 0.30 | 0 | 0 | 0 |
| NTDA | 0 | 0 | 0 | 0 | 0 | .30 | 0 |
| PA | 0 | 0 | 0 | 0 | 0 | 0 | .73 |
| Acrawax C | .25 | .25 | .25 | .25 | .25 | .25 | .25 |

TABLE V-continued

| SAMPLE, WT % | 1 | 2 | 3 | 4 | 5 | 6 | 7 |
|---|---|---|---|---|---|---|---|
| Melt T, °C. | 323 | 314 | 303 | 304 | 301 | 289 | 309 |
| UL-94 Rating | | V-1 | V-0 | V-0 | V-0 | V-0 | |

What is claimed is:

1. A composition, comprising: a polymer selected from the group consisting of polybutylene terephthalate, polyethylene terephthalate, poly(methylmethacrylate), nylon-6, nylon-6,6, nylon-6,12, high temperature nylon, and copolymers of nylon-6 and nylon-6,6 and a flame retardant composition comprising coated particles, said particles have a core material selected from the group consisting of melamine polyphosphate, melamine pyrophosphate, and mixtures thereof; said core material has at least one coating selected from the group consisting of silane, ester, dianhydride, dicarboxylic acid, and mixtures thereof; wherein the said core material comprises from about 94 weight percent to 99.9 weight percent of the composition, and the said coating comprises from about 0.1 weight percent to about 6.0 weight percent of the composition.

2. A composition, comprising: a polymer selected from the group consisting of polybutylene terephthalate, polyethylene terephthalate, poly(methylmethacrylate), nylon-6, nylon-6,6, nylon-6,12, high temperature nylon, or copolymers of nylon-6 and nylon-6,6 having dispersed therein a flame retardant selected from the group consisting of melamine polyphosphate, melamine pyrophosphate, and mixtures thereof, and an additive selected from the group consisting of dicarboxylic acid, dianhydride, and mixtures thereof.

3. The composition of claim 1 or 2 further comprising a reinforcing agent selected from the group consisting of glass, carbon, mica, aramid fibers or mixtures thereof.

4. The composition of claim 1 or 2 wherein the polymer is present at from about 80 to about 95 weight percent and the flame retardant composition is present at from about 5 to about 20 weight percent.

5. The composition of claim 3 wherein the reinforcing agent is present at from about 5 weight percent to about 30 weight percent, the flame retardant is present at from about 10 to about 50 weight percent, and the polymer is present at from about 20 to about 85 weight percent.

6. The composition of claim 1 or 2 which is UL-94 V-0 at 0.16 cm thickness.

7. A flame retardant concentrate comprising from about 15% to about 85% by weight of a flame retardant comprising coated particles, said particles have a core material selected from the group consisting of melamine polyphosphate, melamine pyrophosphate, and mixtures thereof; said core material has at least one coating selected from the group consisting of silane, ester, dianhydride, dicarboxylic acid, and mixtures thereof; wherein the said core material comprises from about 94 weight percent to 99.9 weight percent of the composition, and the said coating comprises from about 0.1 weight percent to about 6.0 weight percent of the composition; and from about 15% to about 50% by weight of a polymer selected from the group consisting of polybutylene terephthalate, polyethylene terephthalate, poly(methylmethacrylate), nylon-6, nylon-6,6, nylon-6,12, high temperature nylon, or copolymers of nylon-6 and nylon-6,6.

8. The composition of claim 1 or 7 wherein the core is melamine pyrophosphate, and the coating is selected from the group consisting of at least one of octyl silane, octyltriethoxysilane, aminosilane, dodecanedioic acid, and pyromellitic dianhydride.

9. The composition of claim 1 or 7 further comprising a processing aid selected from the group consisting of dodecanedioic acid, pyromellitic dianhydride, and terephthalic acid.

10. The composition of claim 2 wherein the additive is dodecanedioic acid, 1,4,5,8-naphthalene tetracarboxylic dianhydride, or pyromellitic anhydride.

11. A process for increasing extruder throughput of a polymer, comprising: adding to a polymer selected from the group consisting of polybutylene terephthalate, polyethylene terephthalate, poly(methylmethacrylate), nylon-6, nylon-6,6, nylon-6,12, high temperature nylon, or copolymers of nylon-6 and nylon-6,6 prior to or during extrusion an additive selected from the group consisting of an organo silane, ester, polyol, dianhydride, dicarboxylic acid, melamine formaldehyde, mixtures thereof, and a flame retardant comprising coated particles, said particles have a core material selected from the group consisting of melamine polyphosphate, melamine pyrophosphate, and mixtures thereof; said core material has at least one coating selected from the group consisting of silane, ester, dianhydride, dicarboxylic acid, and mixtures thereof; wherein the said core material comprises from about 94 weight percent to 99.9 weight percent of the composition, and the said coating comprises from about 0.1 weight percent to about 6.0 weight percent of the composition.

12. The process of claim 11 wherein a polymer containing additive exits the extruder at a maximum temperature of 340° C.

13. The process of claim 12 wherein extruder throughput in kg per hour of the polymer plus additive is at least 10% greater than throughput of the polymer.

* * * * *